June 25, 1963 W. J. McSHANE 3,095,012
PRESSURE CONTROLLING SYSTEM
Filed Aug. 13, 1957 2 Sheets-Sheet 1

WITNESSES:
Bernard R. Gieger
Donald J. Smith

INVENTOR
William J. McShane
BY
Arthur T. Stratton
ATTORNEY

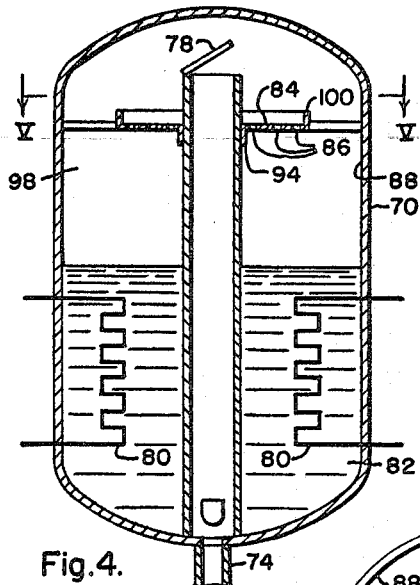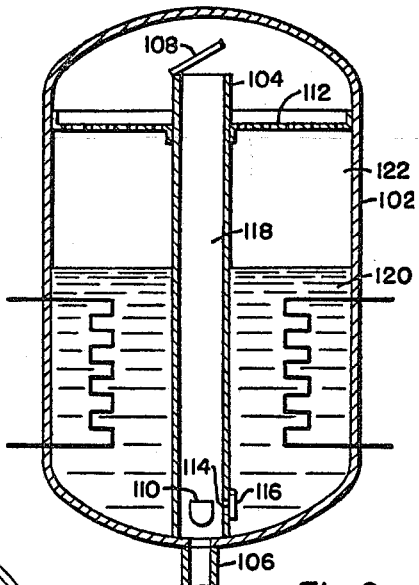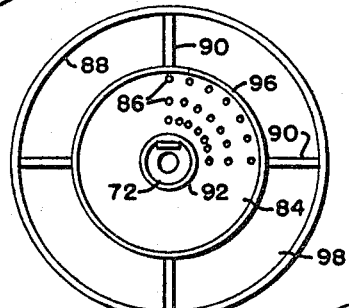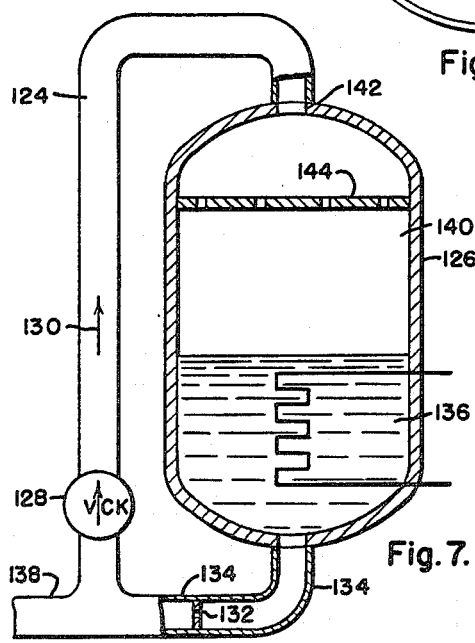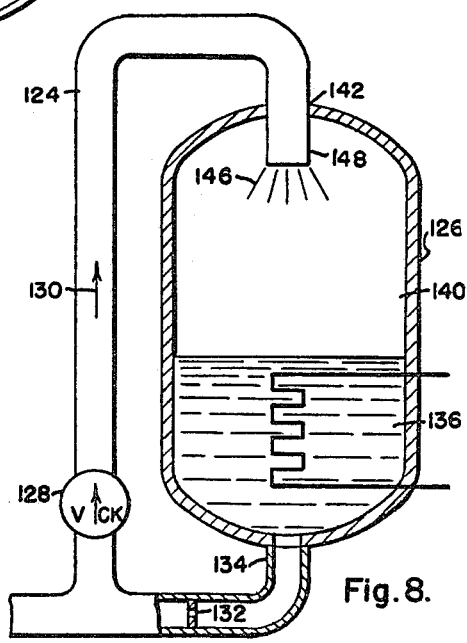

United States Patent Office 3,095,012
Patented June 25, 1963

3,095,012
PRESSURE CONTROLLING SYSTEM
William J. McShane, Scott Township, Allegheny County, Pa., assignor to Westinghouse Electric Corporation, East Pittsburgh, Pa., a corporation of Pennsylvania
Filed Aug. 13, 1957, Ser. No. 677,875
11 Claims. (Cl. 138—30)

The invention forming the subject of the ensuing disclosure is related to a self-proportioning pressure controlling system and, more particularly, to a system which is adapted for employment in conjunction with a coolant circuit associated with a source of heat or of other usable energy, or with any pressurized liquid system subject to pressure fluctuations.

The pressure controlling system of the invention is adapted particularly for use in those applications wherein a liquid vehicle under considerable pressure is employed to extract heat from a suitable heat source or to cool equipment associated with sources of usable energy. The source may include any type of engine or mechanism which is cooled by or from which heat is transferred to a pressurized fluid cooling system containing at least a portion of liquid vehicle.

In that class of pressurized coolant systems noted heretofore, the varying operating conditions of the aforesaid heat sources or mechanisms associated therewith cause wide changes in pressure and volumes within the coolant system. These pressure and volume fluctuations complicate designing and operation of the coolant system and of the energy utilizing devices with which the coolant system is associated, and more particularly, necessitate added structural strength, size, instrumentation, controls and the like.

For the foregoing reasons, it has been found expedient to provide a pressure regulating system which is not only fully automatic or self-proportioning in its operation but which is able to control the pressure fluctuations in the system with which it is utilized, within a comparatively narrow range.

Previously, it has been suggested that one or more surge tanks, accumulators, or the like, be associated in various arrangements within the aforesaid coolant system in order to absorb large pressure or volume variations within the coolant system. Although these arrangements have been found to be adequate in some applications, they do not produce a desirably close degree of control over the coolant fluid pressure, which fineness of control is required in many applications. Furthermore, the additional equipment required is complex in manufacture and is further complicated by conformance with appropriate A.S.M.E. safety regulations with regard to component safety valves and the like. Additionally, relatively large sizes of surge tanks had to be furnished in order to absorb the anticipated pressure and volume variations within the coolant system.

It has likewise been proposed to employ in conjunction with a heated pressurizing vessel, which is adapted for use with a coolant system containing a liquid vehicle, a number of relief valves which are capable of remote operation for the purpose of counteracting increases and decreases in coolant fluid pressure. This prior arrangement, however, is not fully automatic or self-acting, and since it requires either manual control or other external control, it is therefore, susceptible to human or instrumental error. Moreover, complicated controlling circuitry and the like are required which not only has increased the cost of this prior arrangement but has rendered it difficult to confine the coolant pressure within desired narrow limits.

In view of the foregoing, an object of the invention is the provision of novel fully automatic or self-acting means associated with a pressurized liquid system for maintaining the pressure of the system within predetermined limits.

Another object is the provision of means for compensating quickly for both increases and decreases in pressure and volume of the system.

Further objects in accordance with the invention are the provision of means for coupling the novel controlling system to the fluid system being controlled thereby without the provision of additional pumping means and the like, and for fabricating the pressure controlling system with a minimum of component parts. Still another object of the present invention is the provision of a pressure controlling system which can be coupled to the system being controlled in such a manner that the necessity of additional safety valves is obviated.

These and other objects, features and advantages of the invention will be made apparent throughout the ensuing description of exemplary modifications thereof, which description is to be read in conjunction with the accompanying drawings wherein:

FIG. 4 is a longitudinal sectional view of another form of pressure controlling means arranged in accordance with the invention;

FIG. 5 is a cross-sectional view of the pressure controlling means of FIG. 4 taken along reference lines V—V thereof;

FIG. 6 is a longitudinal sectional view of still another form of pressure controlling means arranged according to the teachings of the present invention;

FIGURE 7 is a longitudinal sectional view of another form of pressure controlling means arranged in accordance with the invention; and FIG. 8 is a longitudinal sectional view of still another form of presure controlling means arranged in accordance with the invention.

Within the contemplation of the invention, a pressure controlling system is provided, which system has means associated therewith and operative upon a tendency to an increase of pressure of the system, i.e. a positive system transient, for condensing a portion of a vapor confined within an enclosed space within the pressure controlling system and for providing thereby an additional and adequate volume capable of absorbing sufficient liquid volume of the system being controlled in order to compensate the aforesaid positive transient. Means also are associated with the pressure controlling system for providing the release of sensible heat to the aforesaid liquid and vapor spaces upon a tendency to decrease in pressure of the system, i.e. a negative system transient in order that the resultant increased volume of the vapor confined within the aforesaid enclosed space and coupled to the system being controlled will counteract the aforesaid negative transient. The pressure controlling system, as proposed, by the invention, is adaptable particularly for use with any form of heat producing device or other energy producing or utilizing device which is cooled by a pressurized fluid coolant system containing at least a portion of liquid vehicle, and, more particularly, with such a coolant system wherein it is desired to maintain the pressure thereof within relatively narrow limits.

Figure 1:
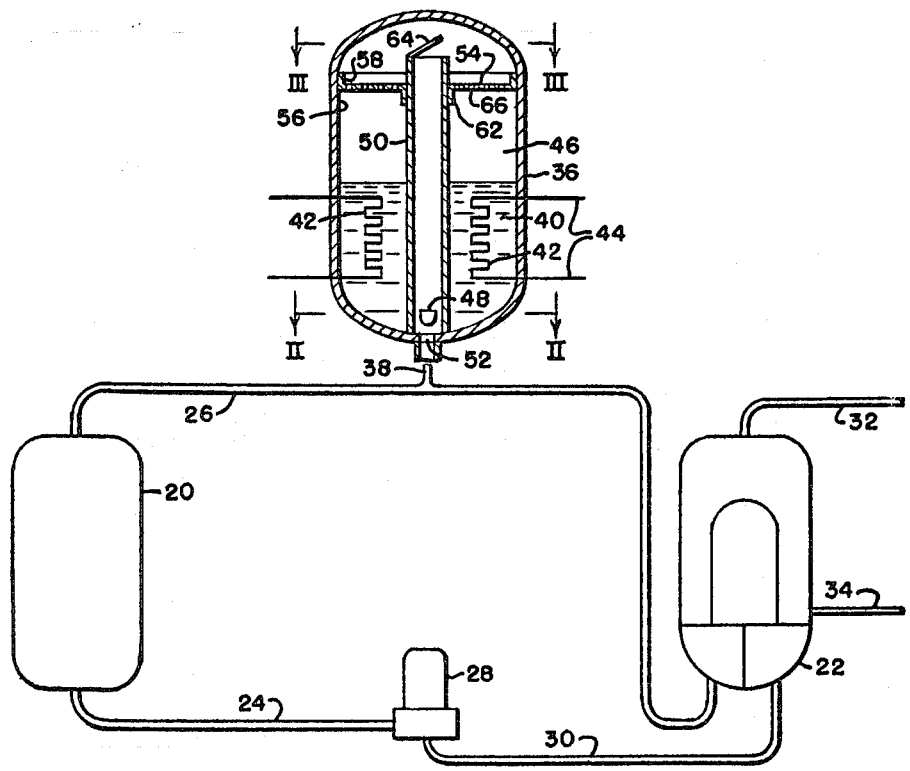
FIG. 1 is a schematic fluid circuit diagram, partially in section, which includes one form of the pressure controlling means arranged in accordance with the invention.
Figure 3:
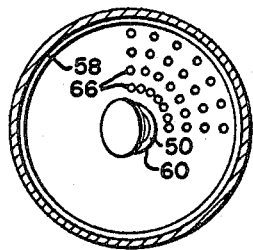
FIG. 3 is another cross-sectional view of the pressurizing vessel of FIG. 1 taken along reference lines III—III thereof.
Figure 2:
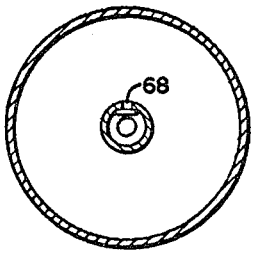
FIG. 2 is a cross-sectional view showing the pressurizing vessel illustrated in FIG. 1 and taken along reference lines II—II thereof.

Referring now more particularly to FIGS. 1 to 3 of the drawings, the illustrative form of pressure controlling means shown therein is adapted for use with a source 20 of heat energy or other mechanism capable of producing heat and a suitable cooling means therefor, such as a heat exchanger 22. A suitable coolant fluid comprising a liquid vehicle for example water is pumped through the heat producing device 20 via an inlet conduit 24 and an outlet conduit 26, by means of a suitable pumping means 28. The suctional side of the pumping means 28 is coupled through a conduit 30 to the outlet side of the cooling means or heat exchanger 22. Additional conduits 32 and 34 are coupled to the cooling means 22 for supplying a suitable coolant fluid thereto. It will be appreciated that the heat source 20, the cooling means 22, the associated pumping means 28 and the aforesaid conduits are provided with adequate structural strength in the well-known manner to render this equipment capable of sustaining the desired pressures to be developed within the coolant system controlled by the aforementioned pressure controlling means.

The aforesaid system pressure is developed by means of a pressurizing vessel 36, which is coupled through a conduit 38 extending through its bottom wall to the outgoing coolant conduit 26. A quantity 40 of a volatile liquid, for example a portion of that comprising the aforesaid coolant fluid, is normally contained within the lower portion of the pressurizing vessel 36. In order to attain the desired pressure within the coolant system as aforesaid, suitable heating means indicated generally by the reference characters 42 are immersed within the liquid portion 40 and are arranged for connection by means of their leads 44 to a source of electrical potential.

These heaters 42 upon being energized are adapted to vaporize a prescribed quantity of the liquid 40 contained within the pressurizing vessel 36, which vapor upon filling a vapor space 46 of the vessel 36 operates to force some of the liquid portion 40 through a hinged check valve 48 and the conduit 38 into the conduit 26 of the coolant system being controlled. The check valve 48 is disposed to control an opening 68 in a wall portion of an upstanding conduit 50 extending longitudinally and interiorly, and desirably centrally of the pressurizing vessel 36, and the check valve is arranged adjacent the lower end of the conduit 50 to permit flow only from the liquid portion 40 into the upstanding conduit. The latter conduit communicates with the connecting conduit 38 through an aperture 52 in the bottom wall of the pressurizing vessel 36. In those coolant systems comprising mixtures of liquid and gaseous fluids, it is intended that the pressurizing vessel 36 be coupled to a normally liquid portion of the system, for an example the lower or incoming conduit 24 or 30.

Adjacent the upward end of the upstanding conduit 50, a suitable heat exchanging means is disposed and includes, for an example, a perforated baffle plate 54. The baffle plate 54, as better shown in FIG. 3 of the drawings, is circumferentially coextensive, in this arrangement of the invention, with the inner diameter of the pressurizing vessel 36 and accordingly is secured to the inner wall 56 of the pressurizing vessel 36 by means of an upstanding peripheral flange portion 58 welded or otherwise secured to the baffle plate 54. The baffle plate 54 is further provided with a central aperture 60 through which the upper extremity of the upstanding conduit 50 is inserted. When the conduit 50 is thus inserted and the perforated baffle plate 54 is positioned in the manner shown, the inward portions thereof are supported, if required, relative to the upstanding conduit 50 by means of an annular collar 62 secured to the conduit 50 in any convenient manner, for example by shrink-fitting, and positioned such as to engage those lower surface portions of the baffle plate 54, which are adjacent the central aperture 60.

At the upward end of the upstanding conduit 50, a hinged flap type check valve 64 is arranged so as to form, under certain conditions, a closure for the upper end of the conduit 50. The check valve 64 is further arranged for permitting flow upwardly only through the upstanding conduit 50 with the result that any possibility of escape therethrough of vapor contained within the vapor space 46 is obviated. Accordingly, the pressures developed within the vapor space 46 upon vaporization of part of the liquid 40 contained within the pressurizing vessel, in the manner described heretofore, are applied substantially entirely to the surface of the liquid portion 40. As indicated previously, the pressure applied by the vapor in this manner is employed for attaining and maintaining the system pressure within the coolant system comprising the conduits 24 and 26, the heat source 20 and the cooling means 22. Under normal operating conditions, that is to say, when the coolant system is not subjected to positive and negative transients induced therein by operating vagaries occurring within the heat source 20 or the cooling means 22, a suitable pressure sensitive switch, not shown and not forming a part of this invention, is coupled within the electric circuit supplying the heaters 42. With this arrangement then, the heaters 42 are operated intermittently when the desired pressure is attained within the coolant system.

Upon the occasion of a positive system transient as aforesaid, the attendant increase in pressure or increase in volume forces a quantity of coolant liquid from the outgoing conduit 26 of the system being controlled into the upstanding conduit 50 of the pressurizing vessel 36 by way of the connecting conduit 38. This incoming surge of coolant liquid operates to close the check valve 48 disposed in a wall portion of the upstanding conduit 50, and accordingly a direct flow of the surge liquid into the liquid portion 40 normally contained within the pressurizing vessel is prevented. The surge liquid then continues to flow upwardly of the conduit 50 and flows therefrom by way of the upwardly directing check valve 64 and outwardly onto the perforated baffle plate 54. From the perforated baffle plate, the surge liquid flows through the many small holes 66 provided therein and descends in relatively fine streams or droplets through the vapor space 46 of the pressurizing vessel. The dispersion of the relatively colder surge liquid entering the pressurizing vessel in this manner then operates to condense at least a portion of the vapor contained within the vapor space 46. As an attendant result of this condensing function, additional volume is provided within the pressurizing vessel 36, and accordingly a correspondingly greater volume of the surge liquid can flow thereinto by way of the upstanding conduit 50 and the associated connecting conduit 38 without increasing the pressure excessively.

When a negative system transient is encountered within the system being controlled, the concomitant tendency to a pressure or a volume decrease within the system is counteracted initially by the liquid portion 40 contained within the pressurizing vessel. This follows from the fact that when such a negative transient is encountered the liquid portion 40 contained within the pressurizing vessel 36 will exist momentarily at a higher pressure than that of the system being controlled due to the intermittent action of the heating elements 42, as explained heretofore. This relatively higher pressure of the liquid portion 40 operates to open the check valve 48 disposed in a wall portion of the conduit 50 whereupon a portion of the liquid 40 flows through an aperture 68 likewise disposed within the aforesaid wall portion and controlled by the check valve 48. Thence, a volume of the liquid portion 40 continues to flow through the check valve 48 and the connecting conduit 38 to the system being controlled until the pressure within the pressurizing vessel 36 is equivalent to that of the system being controlled. During this time, however, the lessening pressure within the vessel 36 effects the release of sensible heat to the vapor space 46 thereof in the form of flash vaporization occurring within the normally liquid portion 40. The release of sensible heat in this manner operates to maintain substantially that prescribed pressure within the vessel 36 which pressure existed before the occurrence of the aforesaid negative transient, with any slight deficit of pressure within the pressurizing vessel 36 being supplied by operation of the heating elements 42 in the manner described heretofore.

In some applications of the invention, it has been found that the temperature of the aforesaid surge liquid entering the pressurizing vessel 36 and its conduit 50 is considerably lower than that of the liquid portion 40, and accordingly an excessive amount of the vapor contained within the vapor surface 46 of the vessel is condensed. Upon the occurrence of the aforesaid positive system transient, therefore, the condensing action of the incoming surge liquid and the resultant increase in available volume within the pressurized vessel will overcompensate the positive transient. Consequently, it is contemplated by the invention that suitable means be provided in association with the aforesaid pressurizing vessel which will limit the tendency of the incoming surge liquid to condense the aforesaid vapor.

One form of such condensing limiting means is illustrated in FIGS. 4 and 5 of the drawings. In this latter arrangement of the invention, a pressurizing vessel 70 is provided with an upstanding conduit 72, a connecting conduit 74 and check valves 76 and 78 which are associated with the upstanding conduit 72. The components of the pressurizing vessel 70 enumerated thus far are similar in function to the check valves and conduits employed in connection with the pressurizing vessel 36 described in FIGS. 1 to 3 of the drawings, and accordingly further exemplification thereof is unnecessary. Similarly, the pressurizing vessel 70 is provided with one or more heating elements 80 which are arranged to vaporize portions of the liquid 82 normally contained within the pressurizing vessel 70 in the manner described previously.

Adjacent the upward end of the upstanding conduit 72, a perforated baffle plate 84 is disposed. In this example of the invention, means are provided for limiting the head of incoming surge liquid which can be developed above the perforations 86 of the baffle plate 84. One form of such head limiting means is associated in this example with the baffle plate 84, whose outer diameter is less than the inside diameter of the pressurizing vessel 70. As better shown in FIG. 5 of the drawings, the latter baffle plate, which is foreshortened in this manner, is secured to the inner wall 88 of the pressurizing vessel 70 by means of a plurality of spokes 90, with four being employed in this example of the invention. The spokes 90 are secured to the aforesaid inner wall in any convenient manner, such as by welding. The baffle plate 84 is further provided with a central aperture 92 through which the upward end of the upstanding conduit 72 is inserted, and the baffle plate 84 is supported thereon by means of a closely fitting annular member 94 secured to the outside surface of the conduit 72.

In this example of the invention, the baffle plate 84 is provided adjacent its outer periphery with a circumferentially extending upturned flange 96. The flange 96, which in this application is generally circular, forms a dam or weir for the baffle plate 84 which likewise is of circular configuration. The flange 96 accordingly serves to limit, according to its selected height, the head of incoming surge liquid, which can be accumulated above the perforations 86, and consequently the amount of the surge liquid which is transformed into droplets or relatively thin streams having ability to condense portions of the vapor contained within vapor space 98 of the pressurizing vessel 70. The balance of the incoming surge liquid then flows over top edge 100 of the flange 96 and flows in a relatively heavy stream through the vapor space 98 into liquid portion 82 of the vessel. The condensing ability or surface of this latter stream is proportionately less and, therefore, has little effect in condensing any part of the vapor maintained within the space 98.

In FIG. 6 of the drawings, another form of the aforesaid condensing limiting means is illustrated therein, and in this latter arrangement of the invention, means are provided for discharging a predetermined portion of the incoming surge liquid directly into the liquid normally maintained within the pressurizing vessel. The balance of the incoming surge liquid then is conducted to a heat exchanging means such as the baffle plates 54 or 84 described heretofore in connection with FIGS. 1 and 4 of the drawings, respectively.

The form of condensing limiting means, illustrated in FIG. 6 of the drawings, is employed in conjunction with a pressurizing vessel 102. Associated with the vessel 102 is an upstanding centrally arranged conduit 104, a connecting conduit 106, check valves 108 and 110, respectively, and a perforated baffle plate 112. The components of the pressurizing vessel 102 enumerated thus far are similar to the corresponding components of the pressurizing vessel 36 illustrated in FIGS. 1 to 3 of the drawings. Accordingly, further description thereof will be dispensed with, save for the purpose of pointing out that the upstanding conduit 104 is provided with an additional flow aperture 114 and an associated hinged flap type check valve 116.

The check valve 116 is similar in structure to the check valve 110 of FIG. 6 or the check valve 48 described in connection with FIGS. 1 to 3 of the drawing with the exception that it is disposed for directing flow outwardly only relative to interior channel 118 of the upstanding conduit 104. The aperture 114 and check valve 116 is disposed at position of sufficient distance below the baffle plate 112 in order that the aperture communicates directly with liquid portion 120 of the vessel 102. With the arrangement of the invention exemplified in FIG. 6 of the drawings, when a positive system transient is encountered, the resultant incoming surge liquid flows into the upstanding conduit 104 of the vessel 102 in the manner discussed previously in connection with FIGS. 1 to 3 of the drawings. At this point, however, the incoming surge liquid opens the check valve 116, and a portion thereof escapes directly into the liquid portion 120 normally maintained within the pressurized vessel 102. The remainder of the incoming surge liquid subsequently flows upwardly of the central conduit 104 of the pressurizing vessel and from the upward end thereof flows outwardly onto the perforated baffle plate 112. Upon conversion into droplets or relatively thin streams by the baffle plate, the latter mentioned portion of the surge liquid then operates in the manner described hereinbefore to condense at least a portion of the vapor contained within the vapor space 122 of the pressurizing vessel 102.

The remaining functional details of the pressurizing vessel 102 of FIG. 6 and also of the pressurizing vessel 70 of FIGS. 4 and 5 are substantially similar to the operation of the pressure controlling system illustrated in FIGS. 1 to 3 of the drawings and accordingly will not be reiterated.

In FIGS. 7 and 8 additional forms of flow proportioning or condensing limiting means are shown, which are arranged according to the invention and which function in a manner similar to those described previously. In this example, however, a standpipe 124 is located externally of a pressurizing vessel 126; and a check valve 128 is mounted in the standpipe 124 to permit flow only in the upward structure, as indicated by flow arrow 130. A flow limiting orifice 132 is provided in the bottom conduit 134, which orifice is furnished in a size appropriate to the proper proportioning of the surge liquid between the standpipe 124 and bottom conduit 134. The bottom conduit 134 is joined to the standpipe 124 at its lower extremity and both are connected at their junction to a conduit 138 whereby the pressure controlling system is coupled to the system being controlled in a manner such as that illustrated in FIG. 1. Accordingly, the orifice 132 accomplishes the same function as that of the check valve 116 of FIG. 6 in permitting a portion of surge liquid to flow directly into the liquid portion 136 of the vessel 126, during a positive system transient. On the other hand the orifice 132 performs the added function of admitting liquid from the vessel 126 into the controlled system, via conduits 134 and 138 during a negative transient. Escape of vapor from vapor chamber 140 of the pressurizing vessel 126 is prevented of course, by the upwardly directing check valve 128. During the aforesaid positive transient that proportion of the surge liquid diverted to the standpipe 124 by the flow limiting orifice 132 and passing through the check valve 128, then flows through the upward portion of the standpipe and into the vessel 126 by way of an opening 142 in the top wall of the vessel. Thence the surge liquid falls onto a perforated baffle plate 144 (FIG. 7), similar to that employed in the arrangements of FIGS. 1 and 6 with the exception that the large central aperture of the latter is omitted. Upon passing through the plate 144, the cooler surge liquid condenses at least a portion of the vapor normally contained within the vessel chamber 140, as aforesaid.

Alternatively, the baffle plate 144 (FIG. 7) can be omitted and a spray nozzle 146 can be substituted therefor, as better shown in FIG. 8 of the drawings. The spray nozzle is coupled to a conduit 148 which is secured to the top wall of the vessel 126 and communicates through the opening 142 therein with the standpipe 124. The more or less atomized surge liquid issuing from the spray nozzle 146 during a positive system transient then operates to condense at least a portion of the vapor within the vessel chamber 140, for the purposes noted heretofore. The nozzle 146 is of conventional design and is arranged to operate at a fairly low differential pressure thereacross to avoid plugging and maintenance insofar as possible. Additionally the relatively low differential pressure characteristics of the spray nozzle permit its operation entirely by the pressure of surge liquid entering the standpipe 124 (FIG. 8) during a positive system transient.

It is further contemplated that a regulating valve means (not shown) can be substituted for the orifice 132 (FIGS. 7 and 8) in the inlet conduit 134 in order to control the proportioning of the surge liquid between top and bottom portions of the vessel 126. In furtherance of this purpose, additional regulating valve means (not shown) can be associated with the standpipe 124.

From the foregoing, it will be apparent that novel and efficient forms of a pressure controlling system have been disclosed herein. As indicated heretofore, the pressure controlling system of the invention can be employed in conjunction with any pressurized system which is subjected to pressure fluctuations therewithin. It will be appreciated that the terms "pressurized system," "coolant system," or "controlled system" as employed herein are intended to include any such system comprising at least a portion of a liquid vehicle wherein the pressure controlling system of the invention can be coupled to the system to be controlled at a point in communication with the aforesaid liquid vehicle. In other words, it is to be understood that the pressure controlling system of the invention can be employed with a sealed pressurized system containing a mixture of gas and liquid, for example, a boiling water system, wherein the pressure controlling system can be coupled in sole communication with the liquid portion of the system being controlled.

It follows then that numerous modifications of the invention will occur to those skilled in the art without departing from the spirit and scope of the invention. Moreover, it is to be understood that certain features of the invention can be employed without a corresponding use of other features.

Accordingly, what is claimed as new is:

1. A pressure controlling system for a pressurized fluid system containing a liquid vehicle, said controlling system comprising a pressurizing vessel having vapor and liquid portions therein, means for heating at least said liquid portion of said vessel, conduit flow-dividing means coupling a single liquid portion of said fluid system to said vapor and liquid portions of said vessel, respectively, and flow-regulating means coupled in at least one branch of said flow-dividing means, whereby liquid flowing from said system and entering said vapor portion of said vessel operates to condense at least a part of heated vapor contained within said vapor portion, said condensed vapor part being determined by said flow-regulating means.

2. A pressure controlling system for a single pressurized fluid system containing a liquid vehicle, said controlling system comprising a pressurizing vessel having vapor and liquid portions therein, means for heating at least said liquid portion of said vessel, conduit flow-dividing means coupling a liquid portion of said fluid system to said vapor and said liquid portions of said vessel, respectively, flow restricting means coupled in that portion of said flow-dividing means coupled to said liquid portion of said vessel, and a check valve disposed in that portion of said flow-dividing means which is coupled to said vapor portion of said vessel.

3. A pressure controlling system for a pressurized fluid system containing a liquid vehicle, said controlling system comprising a pressurizing vessel having vapor and liquid portions therein, means for heating at least said liquid portion of said vessel, conduit flow-dividing means coupling a single liquid portion of said fluid system to said vapor and said liquid portions of said vessel, respectively, flow restricting means mounted in that portion of said flow-dividing means coupled to said liquid portion of said vessel, and a check valve disposed in that portion of said flow-dividing means coupled to said vapor portion of said vessel, said check valve being arranged to permit flow through that portion of said flow-dividing means which is coupled to said vapor portion of said vessel only in a direction toward said last-mentioned vessel portion.

4. A pressure controlling system for a pressurized fluid system containing a liquid vehicle, said controlling system comprising a pressurizing vessel having vapor and liquid portions therein, means for heating at least said liquid portion of said vessel, conduit flow-dividing means coupling a single liquid portion of said fluid system to said vapor and liquid portions of said vessel, respectively, and a liquid spray nozzle mounted within said vapor chamber and coupled into that portion of said flow-dividing means connected to said vapor portion of said vessel.

5. A pressure controlling system for a pressurized fluid system containing a liquid vehicle, said controlling system comprising a pressurizing vessel having vapor and liquid portions therein, means for heating at least said liquid portion of said vessel, conduit flow-dividing means coupling a single liquid portion of said fluid system to said vapor and liquid portions of said vessel, respectively, and a liquid spray nozzle mounted with said vapor portion of said vessel and coupled into that portion of said flow-dividing means connected to said vapor chamber, said spray nozzle being arranged for operation by surge liquid passing through said flow-dividing means during a positive system transient in said fluid system.

6. A pressure controlling system for a pressurized fluid system containing a liquid vehicle, said controlling system comprising a pressurizing vessel having vapor and liquid portions therein, means for heating at least said liquid portion of said vessel, a conduit coupling said liquid chamber to a single liquid portion of said fluid system, and vapor condensing conduit means coupled to said vapor portion of said vessel and to said liquid portion of said fluid system.

7. A pressure controlling system for a pressurized fluid system containing a liquid vehicle, said controlling system comprising a pressurizing vessel having vapor and liquid portions therein, means for heating at least said liquid portion of said vessel, a conduit coupling said liquid portion of said vessel to a liquid portion of said fluid system, and vapor condensing conduit means coupled to said vapor portion of said vessel and to said fluid system liquid portion, said conduit means including a liquid spray nozzle disposed in said vapor portion and operable by liquid passing through said conduit means.

8. A pressure controlling system for a pressurized fluid system containing a liquid vehicle, said controlling system comprising a pressurizing vessel having vapor and liquid portions therein, means for heating said liquid portion of said vessel, branched conduit flow-dividing means coupling a single liquid portion of said fluid system to said vapor and said liquid portions of said vessels respectively, that branch of said conduit means being coupled to said vapor portion of said vessel forming vapor condensing means for said vapor portion, and flow-regulating means coupled in at least one branch of said conduit means.

9. A pressure controlling system for a pressurized fluid system containing a liquid vehicle, said controlling system comprising a pressurizing vessel, means for heating at least a portion of said pressurizing vessel to vaporize a portion of said liquid vehicle, first conduit means coupling a liquid portion of said fluid system to the bottom of said pressurizing vessel, means for condensing at least a portion of the heated vapor contained within the upper portion of said vessel including additional conduit means coupling said first conduit means to the top of said pressurizing vessel, whereby the pressure in said vessel is self-controlled in accordance with the pressure in said fluid system.

10. A pressure controlling system for a pressurized fluid system containing a liquid vehicle, said controlling system comprising a pressurizing vessel, means for heating at least a portion of said pressurizing vessel to vaporize a portion of said liquid vehicle, first conduit means coupling a liquid portion of said fluid system to the bottom of said pressurizing vessel, means for condensing at least a portion of the heated vapor contained within the upper portion of said vessel including additional conduit means coupling said first conduit means to the top of said pressurizing vessel, whereby the pressure in said vessel is self-controlled in accordance with the pressure in said fluid system, and flow-regulating means disposed in at least one of the aforesaid conduit means.

11. A pressure controlling system for a pressurized fluid system containing a liquid vehicle, said controlling system comprising a pressurizing vessel having vapor and liquid portions therein, means for heating at least said liquid portion of said vessel to vaporize a portion of said liquid vehicle, conduit flow-dividing means coupling a single liquid portion of said fluid system to said vapor and said liquid portions of said vessel, respectively, and that portion of said flow-dividing means coupled to said vapor portion of said vessel forming vapor condensing means for said vessel vapor portion, whereby liquid flowing from said vessel system into said vapor portion condenses at least a portion of heated vapor contained within said vessel vapor portion.

References Cited in the file of this patent

UNITED STATES PATENTS

| | | |
|---|---|---|
| 1,960,987 | Biclet | May 29, 1934 |
| 2,081,799 | Doran | May 25, 1937 |
| 2,138,654 | Doran | Nov. 29, 1938 |
| 2,191,490 | Mitterer | Feb. 27, 1940 |
| 2,315,179 | Allender | Mar. 30, 1943 |
| 2,561,528 | Myers | July 24, 1951 |
| 2,754,289 | Meyer | July 10, 1956 |
| 2,880,745 | Regan et al. | Apr. 7, 1959 |

FOREIGN PATENTS

| | | |
|---|---|---|
| 960,519 | France | Oct. 31, 1949 |

OTHER REFERENCES

"International Conference on the Peaceful Uses of Atomic Energy," Report A/Conf. 8/P/815 entitled "Description of the Pressurized Water Reactor (PWR) Power Plant at Shippingport, Pa.," by Simpson et al. FIGURE VI–1 on page 24 relied upon.